United States Patent
Inakura et al.

(10) Patent No.: US 11,295,898 B2
(45) Date of Patent: Apr. 5, 2022

(54) FILM CAPACITOR, FILM FOR FILM CAPACITOR, METHOD OF PRODUCING FILM FOR FILM CAPACITOR, AND METHOD OF PRODUCING FILM CAPACITOR

(71) Applicant: Murata Manufacturing Co., Ltd., Nagaokakyo (JP)

(72) Inventors: Tomoki Inakura, Nagaokakyo (JP); Shinichi Kobayashi, Nagaokakyo (JP); Tomomichi Ichikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 116 days.

(21) Appl. No.: 16/814,216

(22) Filed: Mar. 10, 2020

(65) Prior Publication Data

US 2020/0211779 A1    Jul. 2, 2020

Related U.S. Application Data (63) Continuation of application No. PCT/JP2018/027659, filed on Jul. 24, 2018.

(30) Foreign Application Priority Data

Oct. 4, 2017   (JP) .............................. JP2017-194247

(51) Int. Cl.
*H01G 4/33*  (2006.01)
*H01G 4/012* (2006.01)
*H01G 4/14*  (2006.01)
*H01G 4/32*  (2006.01)

(52) U.S. Cl.
CPC ............... *H01G 4/33* (2013.01); *H01G 4/012* (2013.01); *H01G 4/14* (2013.01); *H01G 4/32* (2013.01)

(58) Field of Classification Search
CPC ............. H01G 4/012; H01G 4/33; H01G 4/32
See application file for complete search history.

(56) References Cited

U.S. PATENT DOCUMENTS

| 9,779,877 | B2 | 10/2017 | Koito |
| 2016/0079000 | A1 | 3/2016 | Koito |
| 2018/0082791 | A1 | 3/2018 | Okuyama et al. |

(Continued)

FOREIGN PATENT DOCUMENTS

| JP | H01198636 A | 8/1989 |
| JP | 2006269727 A | 10/2006 |
| JP | 200767169 A | 3/2007 |

(Continued)

OTHER PUBLICATIONS

International Search Report Issued for PCT/JP2018/027659, dated Oct. 9, 2018.

(Continued)

*Primary Examiner* — Eric W Thomas
(74) *Attorney, Agent, or Firm* — Arent Fox LLP (57) ABSTRACT

A film capacitor that includes a resin layer having a linear protrusion on a first surface thereof and a linear recess on a second surface thereof opposite the first surface, and a metal layer on the first surface of the resin layer. A total length of the linear recess per 1 cm² is 3 m or less, and an average depth of the linear recess is 0.01 μm to 1.3 μm.

20 Claims, 4 Drawing Sheets

(56) References Cited

U.S. PATENT DOCUMENTS

2019/0103220 A1* 4/2019 Hiraoka ................. H01G 4/33

FOREIGN PATENT DOCUMENTS

| JP | 2010129560 A | 6/2010 |
| --- | --- | --- |
| JP | 201289608 A | 5/2012 |
| JP | 2013207158 A | 10/2013 |
| JP | 2015043463 A | 3/2015 |
| JP | 6064956 B2 | 1/2017 |
| WO | 2016159330 A1 | 10/2016 |

OTHER PUBLICATIONS

Written Opinion of the International Searching Authority issued for PCT/JP2018/027659, dated Oct. 9, 2018.

* cited by examiner

FILM CAPACITOR, FILM FOR FILM CAPACITOR, METHOD OF PRODUCING FILM FOR FILM CAPACITOR, AND METHOD OF PRODUCING FILM CAPACITOR

CROSS REFERENCE TO RELATED APPLICATIONS

The present application is a continuation of International application No. PCT/JP2018/027659, filed Jul. 24, 2018, which claims priority to Japanese Patent Application No. 2017-194247, filed Oct. 4, 2017, the entire contents of each of which are incorporated herein by reference.

FIELD OF THE INVENTION

The present invention relates to a film capacitor, a film for a film capacitor, a method of producing a film for a film capacitor, and a method of producing a film capacitor.

BACKGROUND OF THE INVENTION

As one kind of a capacitor, there is a film capacitor having a structure such that, while using a flexible resin film as a dielectric, first and second counter electrodes that oppose each other with the resin film interposed therebetween are disposed. Such a film capacitor is produced, for example, by winding the resin film having the first counter electrode and the resin film having the second counter electrode.

Patent Documents 1 to 3 describe techniques related to a self-recovery function (security operation function, SH function) of a film capacitor. Although all the techniques have the same attention that adhesion between films is weakened in order to enhance the self-recovery function, the methods are different.

Patent Document 1: Japanese Patent Application Laid-Open No. 2006-269727
Patent Document 2: Japanese Patent Application Laid-Open No. 2007-67169
Patent Document 3: Japanese Patent No. 6064956

SUMMARY OF THE INVENTION

The self-recovery function of the film capacitor is exhibited when a fuse portion provided in the film capacitor is cut at the time of short circuit. If the adhesion between films at the fuse portion is too high, since a deposited electrode is less likely to scatter, the fuse portion due to a short-circuit current during dielectric breakdown does not operate, and the self-recovery function may not function sufficiently.

Thus, it is possible to provide a capacitor having good security by reducing the adhesion between the films by greatly roughening the surface of the film.

On the other hand, dielectric breakdown strength is higher when the film surface is smoother.

In the techniques disclosed in Patent Documents 1 to 3, in order to reduce the adhesion between films, an irregularity or gap is separately formed. However, in film capacitors, further miniaturization is required, and it is becoming difficult to adopt the method of the prior art in which the irregularity or gap is formed.

When an electrode is provided by depositing metal on a resin film, a fluorine-based oil may be applied for the purpose of masking for forming an electrode pattern. If the fluorine-based oil remains on the film even after metal deposition, when films are used as a film capacitor, adhesion between film layers may be hindered, and capacitor characteristics such as element electrical capacitance may be degraded.

The present invention has been made to solve the above problems, and an object thereof is to provide a film capacitor having a sufficient self-recovery function and excellent capacitor characteristics. Another object of the present invention is to provide a film for a film capacitor, which is used for producing the film capacitor, a method of producing the film for a film capacitor, and a method of producing a film capacitor using the film for a film capacitor.

The film capacitor of the present invention includes a resin layer having a linear protrusion on a first surface thereof and a linear recess on a second surface thereof opposite the first surface, and a metal layer on the first surface of the resin layer, wherein a total length of the linear recess per 1 $cm^2$ is 3 m or less, and an average depth of the linear recess is 0.01 μm to 1.3 μm.

In the film capacitor of the present invention, the linear recess preferably has an average width of 1 μm to 10 μm and an average depth of 0.01 μm to 1.0 μm, the linear recess has an elliptical shape, and a density of the elliptical shape of the linear recess is preferably 6000 pieces/$cm^2$ or less.

In the film capacitor of the present invention, it is preferable that a major axis direction of the elliptical shape of the linear recess extends toward a longitudinal direction side of the resin layer.

In the film capacitor of the present invention, the linear protrusion preferably has an average width of 1 μm to 10 μm and an average height of 0.01 μm to 0.2 μm, the linear protrusion has an elliptical shape, and a density of the elliptical shape of the linear protrusion is preferably 6000 pieces/$cm^2$ or less.

In the film capacitor of the present invention, it is preferable that a major axis direction of the elliptical shape of the linear protrusion extends toward a longitudinal direction side of the resin layer.

A film for a film capacitor of the present invention includes a resin layer having a linear protrusion on a first surface thereof and a linear recess on a second surface thereof opposite the first surface, wherein a total length of the linear recess per 1 $cm^2$ is 3 m or less, and an average depth of the linear recess is 0.01 μm to 1.3 μm.

In the film for a film capacitor of the present invention, the linear recess preferably has an average width of 1 μm to 10 μm and an average depth of 0.01 μm to 1.0 μm, the linear recess has an elliptical shape, and a density of the elliptical shape of the linear recess is preferably 6000 pieces/$cm^2$ or less.

In the film for a film capacitor of the present invention, it is preferable that a major axis direction of the elliptical shape of the linear recess extends toward a longitudinal direction side of the resin layer.

In the film for a film capacitor of the present invention, the linear protrusion preferably has an average width of 1 μm to 10 μm and an average height of 0.01 μm to 0.2 μm, the linear protrusion has an elliptical shape, and a density of the elliptical shape of the linear protrusion is preferably 6000 pieces/$cm^2$ or less.

In the film for a film capacitor of the present invention, it is preferable that a major axis direction of the elliptical shape of the linear protrusion extends toward a longitudinal direction side of the resin layer.

A method of producing a film for a film capacitor of the present invention includes applying a resin solution onto a base film and forming a resin layer, wherein the base film has a linear protrusion on a resin solution coating surface, a total length of the linear protrusion per 1 cm$^2$ of the base film is 3 m or less, and an average height of the linear protrusion is 0.01 μm to 1.3 μm.

In the method of producing a film for a film capacitor of the present invention, the base film is preferably a polypropylene film.

A method of producing a film capacitor of the present invention further includes providing a metal layer on a first surface of a resin layer having the linear protrusion.

The present invention can provide a film capacitor having a sufficient self-recovery function and excellent capacitor characteristics.

BRIEF EXPLANATION OF THE DRAWINGS

FIG. 6(a), FIG. 6(b), and FIG. 6(c) are process diagrams schematically showing a method of producing a film for a film capacitor of the present invention.

DETAILED DESCRIPTION OF THE INVENTION

Hereinafter, a film capacitor of the present invention, a film for a film capacitor, which is used for producing the film capacitor, a method of producing the film for a film capacitor, and a method of producing a film capacitor using the film for a film capacitor will be described.

However, the present invention is not limited to the configurations described below, and various modifications can be made without departing from the scope of the present invention. The present invention also encompasses a combination of two or more desired structures of the present invention described below.

[Film Capacitor]

Hereinafter, as one embodiment of the film capacitor of the present invention, a wound film capacitor will be described as an example.

Figure 1:
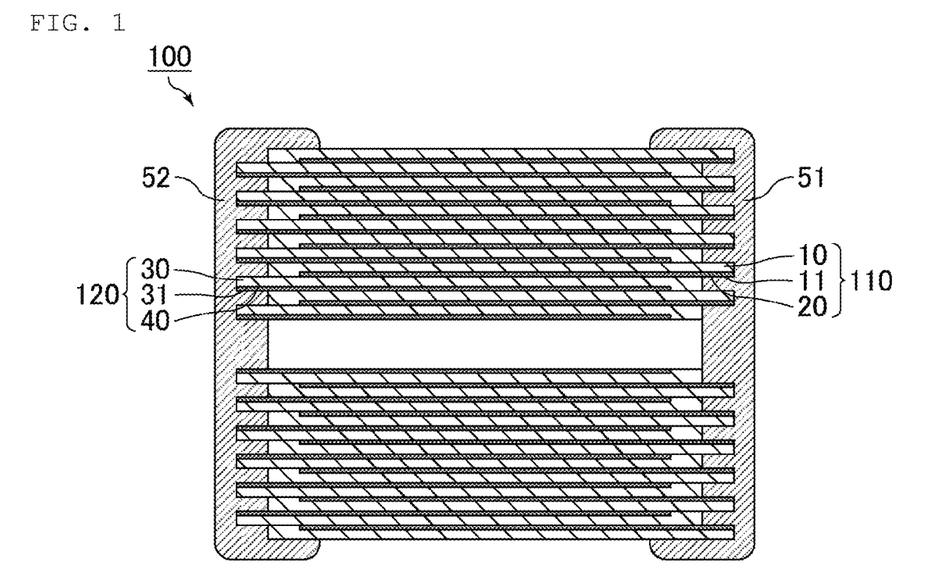
FIG. 1 is a cross-sectional view schematically showing an example of a film capacitor of the present invention.

FIG. 1 is a cross-sectional view schematically showing an example of the film capacitor of the present invention. A film capacitor 100 shown in FIG. 1 is a wound film capacitor and is configured by winding a metallized film 110 including a metal layer 20 provided on a first surface 11 of a resin layer 10 and a metallized film 120 including a metal layer 40 provided on a first surface 31 of a resin layer 30

The film capacitor 100 includes an external terminal electrode 51 electrically connected to the metal layer 20 and an external terminal electrode 52 electrically connected to the metal layer 40.

The metal layer 20 is formed to reach one side edge of the metallized film 110 but not to reach the other side edge. On the other hand, the metal layer 40 is formed not to reach one side edge of the metallized film 120 but to reach the other side edge. The metal layer 20 and the metal layer 40 are made of, for example, aluminum or zinc.

The metallized films 110 and 120 are wound to form a stacked structure with the metallized films 110 and 120 alternately arranged. As shown in FIG. 1, the metallized film 110 and the metallized film 120 are shifted from each other in a width direction so that both an end of the metal layer 20 on the side reaching a side edge of the metallized film 110 and an end of the metal layer 40 on the side reaching a side edge of the metallized film 120 are exposed.

In the film capacitor 100 shown in FIG. 1, the metallized film 110 is wound to be outside the metallized film 120, and the metallized films 110 and 120 are wound such that the metal layer 20 and the metal layer 40 face inward.

The external terminal electrodes 51 and 52 are formed, for example, by spraying zinc or the like on each end surface of a capacitor body obtained as described above. The external terminal electrode 51 is in contact with the exposed end portion of the metal layer 20, thereby being electrically connected to the metal layer 20. On the other hand, the external terminal electrode 52 is in contact with the exposed end portion of the metal layer 40, thereby being electrically connected to the metal layer 40.

The film capacitor of the present invention is preferably pressed into a flat shape such as an ellipse or oval in a cross-sectional shape to have a more compact shape. The film capacitor of the present invention may be provided with a cylindrical winding shaft. The winding shaft is disposed on a center axis of the wound metallized film, and serves as a winding shaft when the metallized film is wound.

In the production of the film capacitor, the film for a film capacitor of the present invention can be used as a film for a film capacitor including a resin layer.

[Film for Film Capacitor]

A film for a film capacitor of the present invention includes a resin layer having a linear protrusion on a first surface thereof and a linear recess on a second surface thereof opposite the first surface. A total length of the linear recess per 1 cm$^2$ is 3 m or less, and an average depth of the linear recess is 0.01 μm to 1.3 μm.

Figure 2:
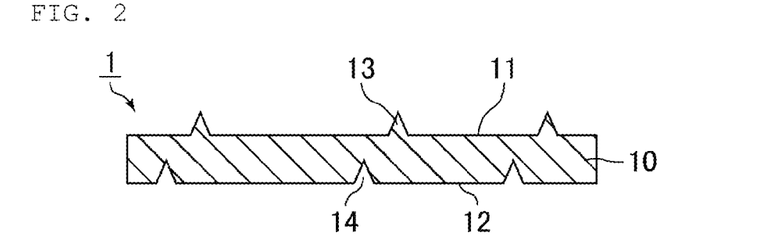
FIG. 2 is a cross-sectional view schematically showing an example of a film for a film capacitor of the present invention.

FIG. 2 is a cross-sectional view schematically showing an example of the film for a film capacitor of the present invention.

A film 1 for a film capacitor is a film having a linear protrusion 13 on the first surface 11 of the resin layer 10 and a linear recess 14 on a second surface 12 of the resin layer 10, and is a dielectric resin film.

The film for a film capacitor is preferably used as a metallized film by providing a metal layer on the first surface of the resin layer and used in the production of the film capacitor.

The film for a film capacitor of the present invention has the linear protrusion and the linear recess in the resin layer.

When the film has the linear protrusion, a gap is formed between the films sufficient to ensure the self-recovery function when formed into a film capacitor. Since portions other than the linear protrusion are smooth, film interlayer adhesion is not reduced significantly, and an electrical capacitance of the film capacitor does not decrease.

When the film has the linear recess, fluorine-based oil applied for the purpose of masking during vapor-deposition of a metal layer enters the linear recess. Thus, film interlayer adhesion inhibition due to the fluorine-based oil can be prevented, so that the electrical capacitance of the film capacitor does not decrease. Since portions other than the linear recess are smooth, a decrease in dielectric breakdown strength of the film is prevented.

Unlike the prior art in which many irregularities or gaps are provided on the entire film, while the film for a film capacitor of the present invention is basically smooth, a relatively small number of partially large linear protrusions and linear recesses are provided, whereby the above-described effects are exhibited.

In the film for a film capacitor of the present invention, the total length, average depth (average height), and average width of the linear recess and the linear protrusion, and a density of an elliptical shape of the linear recess and the linear protrusion are defined. These indices can be measured by taking a photograph of a film surface with a laser microscope and using analysis software.

For example, as a laser microscope, a laser microscope VK8700 from KEYENCE CORPORATION is used, and each index can be measured with the attached analysis software: VK Analyzer.

Figure 3:
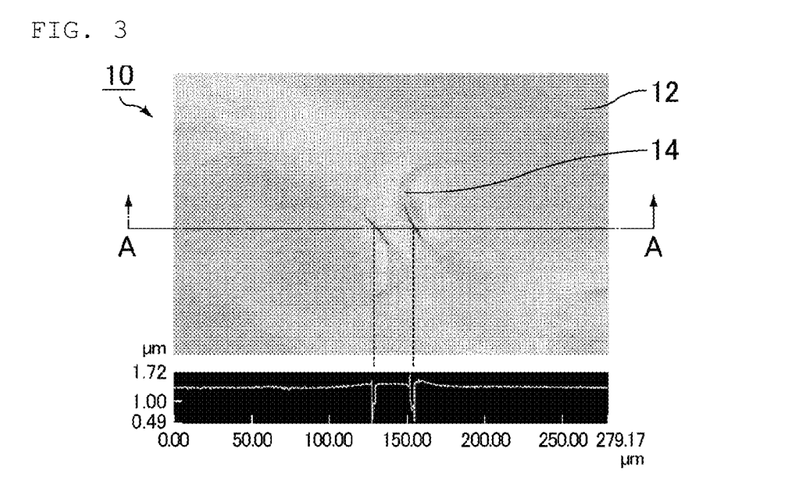
FIG. 3 is an example of a photograph of the film for a film capacitor of the present invention taken from a second surface of a resin layer.

FIG. 3 is an example of a photograph of the film for a film capacitor of the present invention taken from the second surface of the resin layer.

FIG. 3 shows the second surface 12 of the resin layer 10, and an elliptical pattern is seen on the second surface 12. The elliptical pattern is the linear recess 14, and an elliptical portion is more recessed than its surrounding portion.

The lower part of FIG. 3 shows a cross-sectional curve along a line A-A. Since the cross-sectional curve shows a depression at an intersection of the line A-A and the linear recess 14, it can be seen that this part is more recessed than its surrounding portion.

The shape of the linear recess is not particularly limited, but is preferably an elliptical shape. The term "elliptical shape" here is not interpreted as being limited to a mathematically exact ellipse. The elliptical shape may be partially missing or may be cut halfway.

When the linear recess has an elliptical shape, the density of the elliptical shape in the second surface of the resin layer is preferably 6000 pieces/cm² or less. The density of the elliptical shape is preferably 6000 pieces/cm² or less from the viewpoint of not reducing the dielectric breakdown strength.

The density of the elliptical shape is preferably 50 pieces/cm² or more.

The density of the elliptical shape is determined by measuring the number of elliptical shapes present in the field of view of 200 μm×283.6 μm and calculating the number per 1 cm².

In the film for a film capacitor of the present invention, the total length of the linear recess per 1 cm² is 3 m or less in the second surface of the resin layer. This shows a preferable range of presence of the linear recesses (the number and size), and the total length of the linear recesses per 1 cm² is preferably 3 m or less from the viewpoint of not reducing the dielectric breakdown strength.

The total length of the linear recess per 1 cm² is preferably 0.002 m or more.

The total length of the linear recess is determined by measuring the length of the linear recess present in the field of view of 200 μm×283.6 μm and calculating the length per 1 cm².

When the linear recess has an elliptical shape, a circumference L of the ellipse can be approximately measured by the following formula, where a is ½ of a major axis of the ellipse and b is ½ of a minor axis of the ellipse. Therefore, the circumference is taken as the length of the elliptical and linear recess.

$$L \approx \pi(a+b)\left(1 = \frac{3\left(\frac{a-b}{a+b}\right)^2}{10 + \sqrt{4 - 3\left(\frac{a-b}{a+b}\right)^2}}\right)$$

Although the elliptical shape of the linear recess shown in FIG. 3 is cut partially, for a portion where the elliptical shape cannot be visually recognized, the cross-sectional curve is observed, and if the cross-sectional curve is less depressed than its surrounding portion, assuming that the linear recess is cut there, the total length of the linear recess is roughly calculated by tracing the remaining portion of the ellipse on analysis software.

In the film for a film capacitor of the present invention, the average depth of the linear recess is 0.01 μm to 1.3 μm.

For the average depth of the linear recess, depths from the cross-sectional curve are measured at any 10 points for the linear recesses present in the field of view of 200 μm×283.6 μm, and the average value is defined as the average depth.

The average depth of the linear recess is preferably 0.01 to 1.3 μm because the dielectric breakdown strength can be increased.

In particular, the average depth of the linear recess is preferably 0.01 μm to 1.0 μm.

In the film for a film capacitor of the present invention, the average width of the linear recess is preferably 1 μm to 10 μm.

The average width of the linear recess is preferably in the above range because the dielectric breakdown strength can be increased.

For the average width of the linear recess, analysis software is used to measure a width of a recessed portion at any 10 points for the linear recesses present in the field of view of 200 μm×283.6 μm, and the average value is defined as the average width.

When the linear recess has an elliptical shape, it is preferable that a major axis direction of the elliptical shape extends toward a longitudinal direction side of the resin layer. The longitudinal direction of the resin layer is the "winding" direction when a wound film capacitor is formed.

The expression "the major axis direction of the elliptical shape extends toward the longitudinal direction side of the resin layer" here is not limited to a case where the major axis direction of the ellipse coincides with the longitudinal direction of the resin layer. In other words, it means that the major axis direction of the ellipse relatively faces the longitudinal direction of the resin layer relative to the lateral direction of the resin layer.

Figure 4:
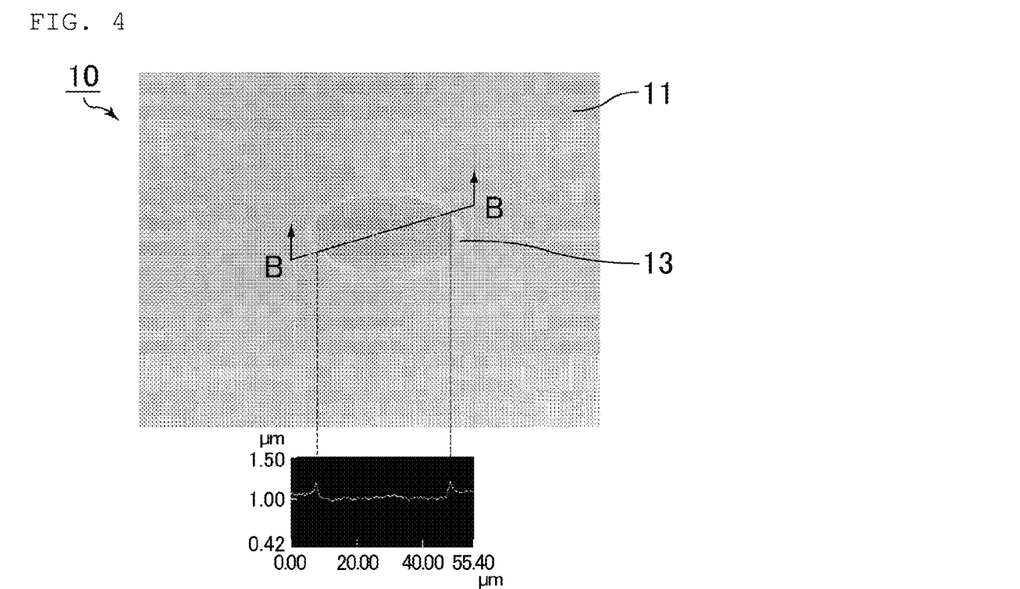
FIG. 4 is an example of a photograph of the film for a film capacitor of the present invention taken from a first surface of the resin layer.

FIG. 4 is an example of a photograph of the film for a film capacitor of the present invention taken from the first surface of the resin layer.

FIG. 4 shows the first surface 11 of the resin layer 10, and an elliptical pattern is seen on the first surface 11. The elliptical pattern is the linear protrusion 13, and an elliptical portion is more convex (further protrudes) than its surrounding portion.

The lower part of FIG. 4 shows a cross-sectional curve along a line B-B. Since the cross-sectional curve shows a mountain-like shape at an intersection of the line B-B and the linear protrusion 13, it can be seen that this part is more convex than its surrounding portion.

The shape of the linear protrusion is not particularly limited, but is preferably an elliptical shape. The term "elliptical shape" here is not interpreted as being limited to a mathematically exact ellipse. The elliptical shape may be partially missing or may be cut halfway.

The linear protrusion preferably has the same shape as the linear recess.

When the linear protrusion has an elliptical shape, the density of the elliptical shape in the first surface of the resin layer is preferably 6000 pieces/cm$^2$ or less. The density of the elliptical shape is preferably 6000 pieces/cm$^2$ or less from the viewpoint of not reducing the dielectric breakdown strength.

The density of the elliptical shape of the linear protrusion is preferably 1.5 pieces/cm$^2$ or more.

The density of the elliptical shape of the linear protrusion can be measured in the same manner as in the density of the elliptical shape of the linear recess.

In the film for a film capacitor of the present invention, the total length of the linear protrusion per 1 cm$^2$ is preferably 2 m or less in the first surface of the resin layer. This shows a preferable range of presence of the linear protrusions (the number and size), and the total length of the linear protrusions per 1 cm$^2$ is preferably 2 m or less from the viewpoint of not reducing the dielectric breakdown strength.

The total length of the linear protrusion per 1 cm$^2$ is preferably 300 μm or more.

The total length of the linear protrusion can be measured in the same manner as in the total length of the linear recess. When the linear protrusion has an elliptical shape, since the length of the linear protrusion can be determined in the same manner as when the linear recess has an elliptical shape, a detailed description thereof is omitted.

The case where the elliptical shape is cut partially can be handled in the same manner as in the case of the linear recess.

The linear protrusion preferably has an average width of 1 μm to 10 μm and an average height of 0.01 μm to 0.2 μm.

The average width and the average height of the linear protrusion can be measured in the same manner as in the measurement of the average width and the average depth of the linear recess.

The average width and average height of the linear protrusion are preferably in the above ranges because the dielectric breakdown strength can be increased.

When the linear protrusion has an elliptical shape, it is preferable that a major axis direction of the elliptical shape extends toward a longitudinal direction side of the resin layer. The longitudinal direction of the resin layer is the "winding" direction when a wound film capacitor is formed.

The expression "the major axis direction of the elliptical shape extends toward the longitudinal direction side of the resin layer" is not limited to a case where the major axis direction of the ellipse coincides with the longitudinal direction of the resin layer. In other words, it means that the major axis direction of the ellipse relatively faces the longitudinal direction of the resin layer relative to the lateral direction of the resin layer.

When both the linear recess and the linear protrusion are elliptical, it is preferable that their major axis directions be the same, and both the linear recess and the linear protrusion extend toward the longitudinal direction side of the resin layer.

When both the linear recess and the linear protrusion are elliptical, it is preferable that only the outer periphery of an ellipse be a recess or a protrusion, and a portion inside the ellipse be flat.

The resin layer may be a thermoplastic resin or a curable resin. When the resin layer is a thermoplastic resin, a polyarylate resin or the like can be used.

When the resin layer is a curable resin, the curable resin may be a thermosetting resin or a photocurable resin.

In addition, it is preferable that a resin having at least one of a urethane bond and a urea bond be contained as a main component. Examples of such a resin include a urethane resin having a urethane bond and a urea resin having a urea bond. The resin may have both the urethane bond and the urea bond.

The presence of urethane bonds and/or urea bonds can be confirmed using a Fourier transform infrared spectrophotometer (FT-IR).

In the present specification, the "main component" means a component having the highest abundance ratio (% by weight), preferably a component having an abundance ratio exceeding 50% by weight. Therefore, the resin layer may contain, as components other than the main component, for example, an additive such as a silicone resin or an uncured portion of a starting material such as a first organic material and a second organic material described later.

The resin layer is preferably mainly composed of a curable resin. The curable resin may be a thermosetting resin or a photocurable resin. The resin layer may contain a thermoplastic resin.

When the resin layer is a thermoplastic resin, a polyarylate resin or the like can be used.

In the present specification, the thermosetting resin means a resin that can be cured by heat, and does not limit the curing method. Therefore, as long as the resin can be cured by heat, a resin cured by a method other than heat (for example, light, electron beam, etc.) is also included in the thermosetting resin. Depending on the material, the reaction may start due to reactivity of the material itself, and resins gradually cured without necessarily applying heat or light from the outside are also regarded as thermosetting resins. The same applies to the photocurable resin, and the curing method is not limited.

The curable resin is preferably made of a cured product of the first organic material and the second organic material. Examples of the curable resin include a cured product obtained by reacting a hydroxyl group (OH group) of the first organic material with an isocyanate group (NCO group) of the second organic material.

When a cured product is obtained by the above reaction, an uncured portion of a starting material may remain in the resin layer. For example, the resin layer may include an isocyanate group (NCO group). The presence of the isocyanate group can be confirmed using a Fourier transform infrared spectrophotometer (FT-IR).

The first organic material is preferably a polyol having a plurality of hydroxyl groups (OH groups) in the molecule. Examples of the polyol include polyether polyol, polyester polyol, and polyvinyl acetoacetal.

Two or more organic materials may be used in combination as the first organic material. Among the first organic materials, a phenoxy resin belonging to the polyether polyol is preferable.

The second organic material is preferably an isocyanate compound, epoxy group-containing epoxy resin or melamine resin having a plurality of functional groups in the molecule. Two or more organic materials may be used in combination as the second organic material.

Examples of the isocyanate compound include aromatic polyisocyanates such as diphenylmethane diisocyanate (MDI) and tolylene diisocyanate (TDI), and aliphatic polyisocyanates such as hexamethylene diisocyanate (HDI). A modified product of these polyisocyanates, for example, a modified product having carbodiimide or urethane may be used. Among them, aromatic polyisocyanate is preferable, and MDI is more preferable.

The epoxy resin is not particularly limited as long as it has an epoxy ring, and examples thereof include bisphenol A type epoxy resin, biphenyl skeleton epoxy resin, cyclopentadiene skeleton epoxy resin, and naphthalene skeleton epoxy resin.

The melamine resin is not particularly limited as long as it is an organic nitrogen compound having a triazine ring at the center of the structure and three amino groups around the triazine ring, and examples thereof include alkylated melamine resins. Other modified products of melamine may be employed.

The resin layer can also contain an additive for adding other functions. For example, smoothness can be imparted by adding a leveling agent. The additive is more preferably a material that has a functional group reacting with a hydroxyl group and/or an isocyanate group and forms a portion of a crosslinked structure of a cured product. Examples of such a material include a resin having at least one functional group selected from the group consisting of an epoxy group, a silanol group, and a carboxyl group.

Although the thickness of the resin layer is not particularly limited, it is preferably 1 μm to 10 μm.

The thickness of the resin layer here means the thickness measured in a place where the linear recess and the linear protrusion are not present.

When the thickness of the resin layer is 1 μm to 10 μm, the number of defects such as cracks generated during film formation can be reduced.

The film for a film capacitor of the present invention can be formed into a metallized film by providing a metal layer on the first surface of the resin layer.

Figure 5:
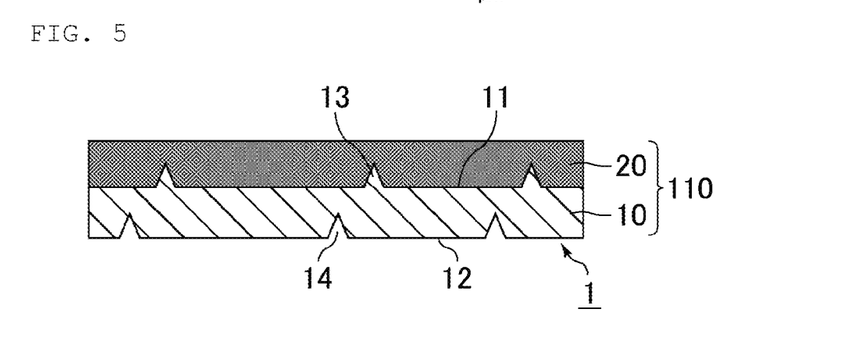
FIG. 5 is a cross-sectional view schematically showing an example of a metallized film having a metal layer in a film for a film capacitor of the present invention.

FIG. 5 is a cross-sectional view schematically showing an example of a metallized film having a metal layer in the film for a film capacitor of the present invention.

In the metallized film 110 shown in FIG. 5, the metal layer 20 is provided on the first surface 11 of the resin layer 10 of the film 1 for film capacitor.

The metal layer 20 is provided on the first surface 11 of the resin layer 10 so as to ascend along the linear protrusion 13, and there is no particular gap between the linear protrusion 13 and the metal layer 20.

Examples of the metal layer include aluminum or zinc.

When a material constituting the metal layer is aluminum or zinc, it is easy to maintain good bonding properties with the external terminal electrode.

The metal layer is preferably provided with a fuse portion.

The fuse portion means a portion which connects electrode portions in which the metal layer used as a counter electrode is divided into plural portions. A pattern of the metal layer having the fuse portion is not particularly limited, and for example, an electrode pattern disclosed in Japanese Patent Application Laid-Open Nos. 2004-363431 and 5-251266 can be used.

Next, a method of producing a film for a film capacitor of the present invention will be described.

The method of producing a film for a film capacitor of the present invention includes applying a resin solution onto a base film and forming a resin layer.

As the base film, a film having a linear protrusion on a resin solution coating surface is used. Thus, the shape of the linear protrusion of the base film is transferred to the second surface side of the resin layer, and a film for a film capacitor, which has a linear recess, is produced. A portion of the linear protrusion of the base film is lifted to form the linear protrusion on the first surface of the resin layer.

Figure 6A:
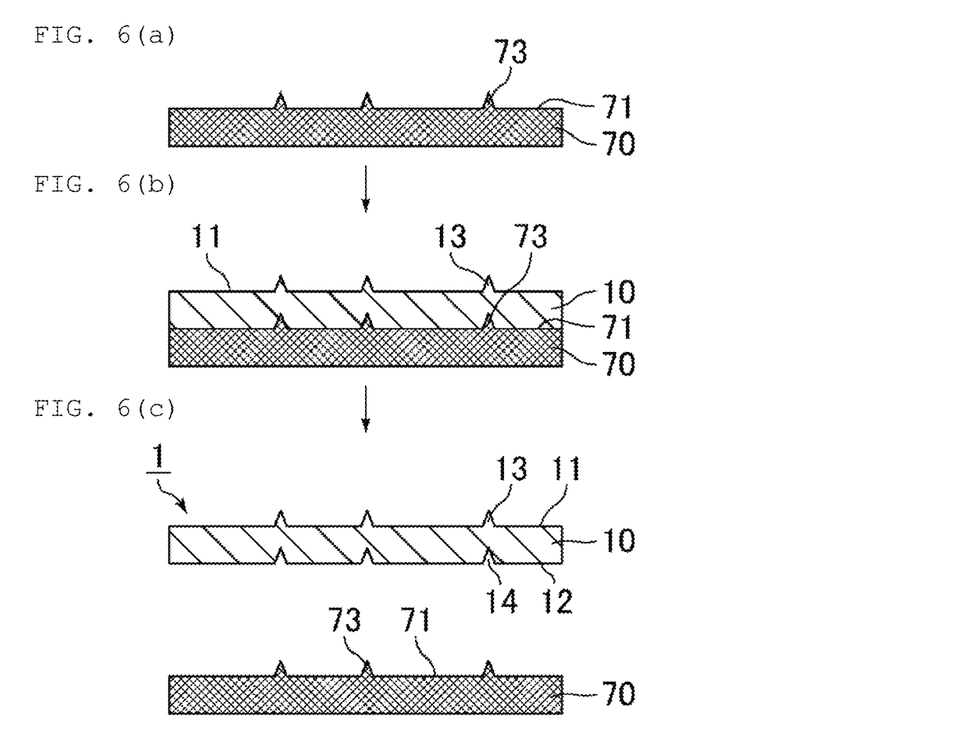

FIG. 6(a), FIG. 6(b), and FIG. 6(c) are process diagrams schematically showing the method of producing a film for a film capacitor of the present invention.

First, as shown in FIG. 6(a), a base film 70 is prepared. The base film 70 has a linear protrusion 73 on a resin solution coating surface 71 of the base film 70.

Figure 7:
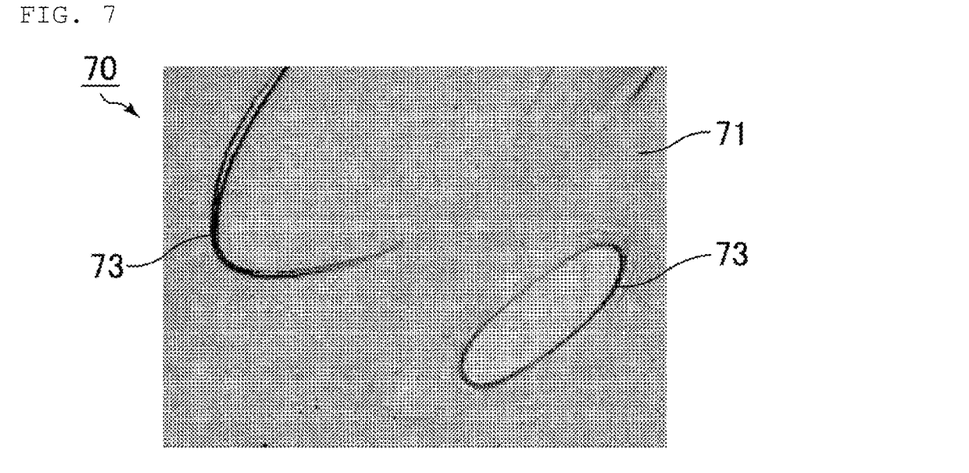
FIG. 7 is an example of a photograph taken of a resin solution coating surface of a base film.

FIG. 7 is an example of a photograph taken of the resin solution coating surface of the base film. It can be seen that the elliptical and linear protrusion 73 is formed on the resin solution coating surface 71 of the base film 70.

It can also be seen that the shape of the linear protrusion of the base film is substantially the same as the shape of the linear recesses and the shape of the linear protrusions in the film for a film capacitor as shown above.

As shown in FIG. 6(b), the resin solution is applied onto the resin solution coating surface 71 of the base film 70 to form the resin layer 10. The resin layer 10 is lifted at a position of the linear protrusion 73, and the linear protrusion 13 is formed on an upper surface (first surface 11) of the resin layer. The shape of the linear protrusion 13 formed on the first surface 11 of the resin layer 10 corresponds to the shape of the linear protrusion 73 of the resin solution coating surface 71.

After the application of the resin solution, the resin layer is formed by performing treatments such as curing and drying of the resin as necessary.

Then, as shown in FIG. 6(c), when the resin layer 10 is peeled from the base film 70, the linear recess 14 appears on the second surface 12 of the resin layer 10.

Thus, the film 1 for a film capacitor is obtained.

The shape of the linear recess 14 formed on the second surface 12 of the resin layer 10 corresponds to the shape of the linear protrusion 73 of the resin solution coating surface 71.

The linear protrusion and the linear recess provided in the film for a film capacitor are both derived from the linear protrusion of the base film.

In the base film used in the method of producing a film for a film capacitor of the present invention, in the resin solution coating surface, the total length of the linear protrusion is 3 m or less per 1 $cm^2$ of the base film, and the average height of the linear protrusion is 0.01 μm to 1.3 μm.

As long as the total length and the average height of the linear protrusion on the resin solution coating surface are in these range, the total length and the average depth of the linear recess provided on the second surface of the resin layer can be set within a preferred range.

The average width of the linear protrusion in the resin solution coating surface is preferably 1 μm to 10 μm. The density of the elliptical shape of the linear protrusion in the resin solution coating surface is preferably 6000 pieces/$cm^2$ or less.

In the linear protrusion on the resin solution coating surface, the indices of the total length, average height, average width, and density of the elliptical shape can be measured by the same method as the method shown as the method of measuring these indices for the film for a film capacitor of the present invention.

The base film is preferably a polypropylene film.

As a polypropylene film, one having a linear protrusion formed by stretching is available as a commercial product. It is preferable to select and use a polypropylene film in which a linear protrusion having suitable total length, average width, and average height is formed by stretching.

As a commercially available polypropylene film, there is one in which the total length, average width, and average height of the linear protrusion are relatively large (the density of the elliptical shape is large), and there is one in which the total length, average width, and average height of the linear protrusion are relatively small (the density of the elliptical shape is small). However, in the method of producing a film for a film capacitor of the present invention, a polypropylene film in which the total length, average width, and average height of the linear protrusion are relatively small (the density of the elliptical shape is small) is preferably selected.

When a linear protrusion is formed by stretching of a polypropylene film, an elliptical and linear protrusion is formed such that the stretching direction of the polypropylene film is a longitudinal direction of the elliptical shape.

As a resin solution used for forming a film for a film capacitor, a resin solution in which a raw material resin or a precursor of the resin is dispersed in a solvent can be used.

The solvent (methyl ethyl ketone, tetrahydrofuran, ethyl acetate, etc.) contained in the resin solution may be present as a residue in the resin layer.

Next, another embodiment in which the shape of the base film is different and the shape of the film for a film capacitor, which is to be obtained, is also different will be described.

Although FIG. 6(a) shows the base film in which the linear protrusion is provided on one side of the base film, the linear protrusions may be provided on both sides of the base film.

A case will be described in which a film for a film capacitor is obtained through applying a resin solution onto a base film provided with linear protrusions on both sides and then winding the film.

FIG. 8(a), FIG. 8(b), FIG. 8(c), FIG. 8(d) and FIG. 8(e) are process diagrams schematically showing another example of the method of producing a film for a film capacitor of the present invention.

Figure 8A:
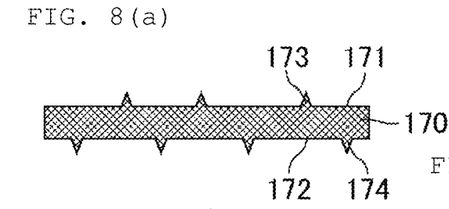
FIG. 8(a), FIG. 8(b), FIG. 8(c), FIG. 8(d) and FIG. 8(e) are process diagrams schematically showing another example of the method of producing a film for a film capacitor of the present invention.

As shown in FIG. 8(a), a base film 170 is prepared. The base film 170 has a linear protrusion 173 on the resin solution coating surface 171 and also has a linear protrusion 174 on a surface 172 opposite to the resin solution coating surface 171.

Figure 8B:
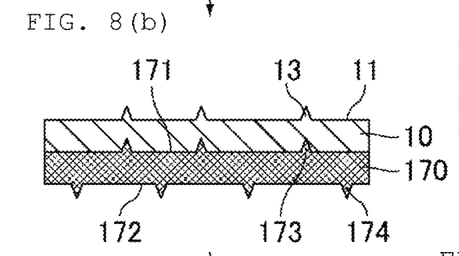

As shown in FIG. 8(b), the resin solution is applied onto the resin solution coating surface 171 of the base film 170 to form the resin layer 10. The resin layer 10 is lifted at a position of the linear protrusion 173, and the linear protrusion 13 is formed on the upper surface (first surface 11) of the resin layer. The shape of the linear protrusion 13 formed on the first surface 11 of the resin layer 10 corresponds to the shape of the linear protrusion 173 of the resin solution coating surface 171.

Here, the base film 170 is a roll-shaped film continuous in the longitudinal direction. After the resin solution is applied onto the base film 170 and dried, the film after the application is wound.

Figures 8C, 8E:
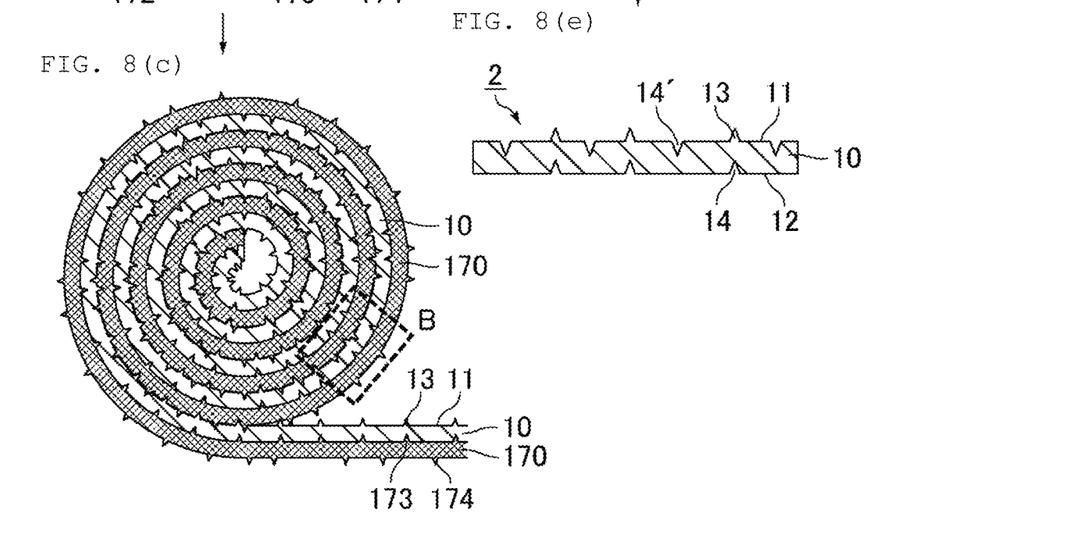

FIG. 8(c) shows a state where the film after application is wound.

Figure 8D:
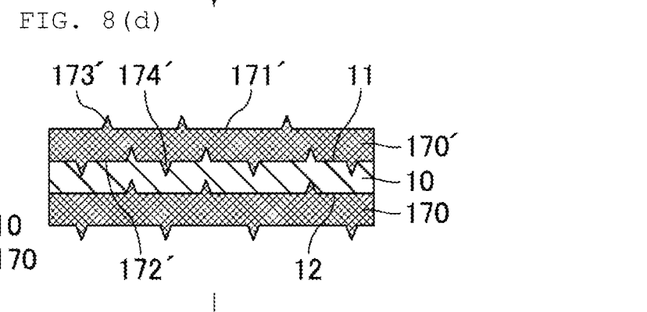

FIG. 8(d) shows an enlarged view of a portion (region surrounded by a dotted line B) when the film after application is wound.

When the film after application is wound, a base film 170' is adjacent to the first surface 11 of the resin layer 10. The base film 170' also has a linear protrusion 173' on a resin solution coating surface 171' of the base film 170', and further has a linear protrusion 174' on a surface 172' opposite to the resin solution coating surface 171'. Therefore, the linear protrusion 174' may be in contact with the first surface 11 of the resin layer 10, and the linear protrusion 174' may bite into a portion of the first surface 11 of the resin layer 10.

FIG. 8(e) shows a film 2 for a film capacitor obtained by performing a treatment such as resin curing on the film after application that has undergone the above steps, and peeling the resin layer from the base film.

The film 2 for a film capacitor has the linear protrusion 13 on the first surface 11 of the resin layer 10 and, in addition, a linear recess 14' on the first surface 11 of the resin layer 10.

The resin layer 10 has the linear recess 14 on the second surface 12.

When the film after application is wound, the linear recess 14' may be formed due to biting of the linear protrusion 174' or may not be formed.

The film 2 for a film capacitor, which is thus configured, is also the film for a film capacitor of the present invention, and can exhibit the effects of the film for a film capacitor of the present invention.

[Method of Producing Film Capacitor]

Next, a method of producing a film capacitor of the present invention will be described.

The method of producing a film capacitor of the present invention includes providing a metal layer on a first surface of a resin layer on which a linear protrusion is formed in a film for a film capacitor obtained by the method of producing a film for a film capacitor of the present invention.

Examples of the method of providing the metal layer on the first surface of the resin layer of the film for a film capacitor include vapor deposition.

In the film for a film capacitor, the metal layer is provided on the first surface of the resin layer on which the linear protrusion is formed, whereby a metallized film is obtained. A metallized film having the resin layer, having the linear protrusion on the first surface and the linear recess on the second surface, and the metal layer provided on the first surface of the resin layer is obtained.

Two such metallized films are stacked while being shifted by a predetermined distance in the width direction, and then wound to obtain a laminate.

If necessary, the laminate may be pressed into an elliptical cylindrical shape with the laminate sandwiched in a direction perpendicular to the width direction.

Subsequently, an external terminal electrode is formed on an end surface of the laminate, whereby a film capacitor as shown in FIG. 1 is obtained. Examples of the method of forming the external terminal electrode on the end surface of the laminate include thermal spraying.

EXAMPLES

Hereinafter, examples specifically showing the film capacitor and the film for a film capacitor of the present invention will be described. The present invention is not limited to only these examples.

Example 1

[Production of Film for Film Capacitor]

As a base film, a polypropylene film having on its both sides 100 elliptical and linear protrusions per 1 $cm^2$, which have an average height of 0.3 μm, was prepared.

A resin solution was prepared by dissolving and mixing a phenoxy resin and a diphenylmethane diisocyanate (MDI) variant in an organic solvent. The resin solution was applied onto the base film, the organic solvent was dried and removed, and the film after application was then wound up.

The phenoxy resin and the diphenylmethane diisocyanate (MDI) variant were reacted thermally and then peeled off from the base film to produce a film for a film capacitor. The elliptical and linear recess was formed on the release surface (second surface) side of the resin layer of the produced film for a film capacitor, and the linear protrusion and the linear recess having an elliptical shape were formed on the dried surface (first surface) side.

Example 2

As a base film, a polypropylene film having on its both sides 6000 elliptical and linear protrusions per 1 cm$^2$, which have an average height of 0.7 μm, was prepared.

A film for a film capacitor was produced in the same manner as Example 1 except for the above procedure.

The elliptical and linear recess was formed on the release surface (second surface) side of the resin layer of the produced film for a film capacitor, and the elliptical and linear protrusion was formed on the dried surface (first surface) side.

Example 3

As a base film, a polypropylene film having on its both sides 100 elliptical and linear protrusions per 1 cm$^2$, which have an average height of 0.3 μm, was prepared.

A resin solution was prepared by dissolving and mixing a polyvinyl acetoacetal resin and a tolylene diisocyanate (TDI) variant in an organic solvent. The resin solution was applied onto the base film, the organic solvent was dried and removed, and the film after application was then wound up.

The polyvinyl acetoacetal resin and the tolylene diisocyanate (TDI) variant were reacted thermally and then peeled off from the base film to produce a film for a film capacitor. The elliptical and linear recess was formed on the release surface (second surface) side of the resin layer of the produced film for a film capacitor, and the linear protrusion and the linear recess having an elliptical shape were formed on the dried surface (first surface) side.

Example 4

As a base film, a polypropylene film having on its both sides 100 elliptical and linear protrusions per 1 cm$^2$, which have an average height of 0.3 μm, was prepared.

A resin solution was prepared by dissolving a polyarylate resin (manufactured by UNITIKA LTD.) in an organic solvent and applied onto a base film. After the organic solvent was removed by drying, the film after application was wound up.

Thereafter, the polyarylate resin film was peeled off from the base film to produce a film for a film capacitor. The elliptical and linear recess was formed on the release surface (second surface) side of the resin layer of the produced film for a film capacitor, and the linear protrusion and the linear recess having an elliptical shape were formed on the dried surface (first surface) side.

Comparative Example 1

As a base film, a PET film with a release layer having no linear protrusions on the surface was prepared and used as the base film.

A film for a film capacitor was produced in the same manner as Example 1 except for the above procedure.

The linear recess and the linear protrusion having an elliptical shape were not formed on the dried surface (first surface) side and the release surface (second surface) side of the resin layer of the produced film for a film capacitor, and the first and second surfaces were smooth.

Comparative Example 2

As a base film, a polypropylene film having on its both sides 6000 elliptical and linear protrusions per 1 cm$^2$, which have an average height of 2.5 μm, was prepared.

A film for a film capacitor was produced in the same manner as Example 1 except for the above procedure.

The elliptical and linear recess was formed on the release surface (second surface) side of the resin layer of the produced film for a film capacitor, and the elliptical and linear protrusion was formed on the dried surface (first surface) side.

For the films for a film capacitor film produced in Examples and Comparative Examples, the number of linear protrusions and linear recesses on the dried surface (first surface) side of the resin layer, the average width, and the average height were measured based on the measurement methods described in the present specification, and these characteristics were summarized in Table 1.

The linear protrusion and the linear recess on the release surface (second surface) side of the resin layer were similarly measured, and these characteristics were summarized in Table 2.

TABLE 1

| Dried surface (first surface) | Linear protrusion | | | | Linear recess | | |
|---|---|---|---|---|---|---|---|
| | Number of protrusions [piece/cm$^2$] | Average width [μm] | Average height [μm] | Total length [m/cm$^2$] | Number of recesses [piece/cm$^2$] | Average width [μm] | Average depth [μm] |
| Example 1 | 2.7 | 3.60 | 0.04 | 0.003 | 17 | 1.94 | 0.07 |
| Example 2 | 3067 | 4.37 | 0.06 | — | 0 | — | — |
| Example 3 | 5.2 | 5.96 | 0.08 | 0.06 | 189 | 5.82 | 0.59 |
| Example 4 | 1.3 | 2.22 | 0.05 | 0.003 | 98 | 3.33 | 0.19 |
| Comparative Example 1 | 0 | — | — | — | 0 | — | — |
| Comparative Example 2 | 3100 | 6.01 | 0.44 | — | 0 | — | — |

TABLE 2

| Release surface (second surface) | Linear protrusion | | | Linear recess | | | |
|---|---|---|---|---|---|---|---|
| | Number of protrusions [piece/cm²] | Average width [μm] | Average height [μm] | Total length [m/cm²] | Number of recesses [piece/cm²] | Average width [μm] | Average depth [μm] |
| Example 1 | 0 | — | — | 0.09 | 94 | 3.49 | 0.28 |
| Example 2 | 0 | — | — | 3.00 | 5733 | 4.24 | 0.74 |
| Example 3 | 0 | — | — | 0.09 | 104 | 5.26 | 0.10 |
| Example 4 | 0 | — | — | 0.02 | 78 | 1.80 | 0.07 |
| Comparative Example 1 | 0 | — | — | — | 0 | — | — |
| Comparative Example 2 | 0 | — | — | 4.40 | 6167 | 4.74 | 1.47 |

[Measurement of Dielectric Breakdown Strength]

A vacuum deposition apparatus was used to provide aluminum thin films as electrodes on both sides of the film for a film capacitor produced in each example and each comparative example, and then a voltage was applied to the film in an atmosphere of 125° C. The voltage was increased until the film was pierced, and the voltage at which the film was pierced was defined as the dielectric breakdown strength. 16 points were measured, and the average value was obtained.

The evaluation results were summarized in Table 3.

[Production of Capacitor, Measurement of Element Electrical Capacitance, Evaluation of Self-Recovery Function]

A vacuum deposition apparatus was used to provide an aluminum thin film on the dried surface (first surface) side of the resin layer of the film for a film capacitor produced in each example and each comparative example, and thus to produce a metallized film. At that time, in order to apply a pattern to the aluminum thin film, fluorine-based oil was applied onto the film for a film capacitor. The metallized film was cut into a predetermined width, and wound in a cylindrical shape by a predetermined length, and metal was sprayed on both ends thereof to produce a film capacitor.

The electrical capacitance of the film capacitor was measured.

A voltage was applied to the film capacitor, and the voltage was gradually increased to check whether the self-recovery function worked.

The evaluation results were summarized in Table 3.

TABLE 3

| | Dielectric breakdown strength [V/μm] | Element electrical capacitance [μF] | Self-recovery function |
|---|---|---|---|
| Example 1 | 419 | 19.8 | Good |
| Example 2 | 353 | 20.0 | Good |
| Example 3 | 397 | 19.8 | Good |
| Example 4 | 382 | 19.9 | Good |
| Comparative Example 1 | 400 | 16.0 | Poor |
| Comparative Example 2 | 195 | 20.0 | Good |

In Examples 1 to 4, the dielectric breakdown strength and the element electrical capacitance are large, and the self-recovery function is good.

When Examples 1, 3, and 4 and Example 2 are compared to each other, in the linear recess on the second surface of the resin layer in Example 2, the total length, the number of elliptical shapes, the average width, and the average depth are large, and therefore, the element electrical capacitance is large. This seems to be due to the fact that fluorine-based oil soaks into the linear recess to improve adhesion between film layers.

In Comparative Example 1, the linear recess and the linear protrusion were not present. Therefore, the element electrical capacitance was low, and gas release properties were not good, so that Comparative Example 1 was inferior in the self-recovery function.

In Comparative Example 2, the total length of the linear recess was too large, and the average depth of the linear recess was too deep, so that the dielectric breakdown strength was low.

DESCRIPTION OF REFERENCE SYMBOLS

1, 2: Film for film capacitor
10, 30: Resin layer
11, 31: First surface
12: Second surface
13: Linear protrusion
14: Linear recess
14': Linear recess provided on first surface
20, 40: Metal layer
51, 52: External terminal electrode
70, 170, 170': Base film
71, 171, 171': Resin solution coating surface
73, 173, 173': Linear protrusion on resin solution coating surface
100: Film capacitor
110, 120: Metallized film
172, 172': Surface opposite to resin solution coating surface
174, 174': Linear protrusion on surface opposite to resin solution coating surface

The invention claimed is:

1. A film capacitor comprising:
a resin layer having a linear protrusion on a first surface thereof and a linear recess on a second surface thereof opposite the first surface; and
a metal layer on the first surface of the resin layer, wherein a total length of the linear recess per 1 cm² is 3 m or less, and an average depth of the linear recess is 0.01 μm to 1.3 μm.

2. The film capacitor according to claim 1, wherein
the linear recess has an average width of 1 μm to 10 μm and an average depth of 0.01 μm to 1.0 μm,
the linear recess has an elliptical shape, and
a density of the elliptical shape of the linear recess is 6000 pieces/cm² or less.

3. The film capacitor according to claim 2, wherein the density of the elliptical shape of the linear recess is 50 pieces/cm² to 6000 pieces/cm².

4. The film capacitor according to claim 2, wherein a major axis direction of the elliptical shape of the linear recess extends toward a longitudinal direction side of the resin layer.

5. The film capacitor according to claim 2, wherein
the linear protrusion has an average width of 1 µm to 10 µm and an average height of 0.01 µm to 0.2 µm,
the linear protrusion has an elliptical shape, and
a density of the elliptical shape of the linear protrusion is 6000 pieces/cm² or less.

6. The film capacitor according to claim 5, wherein the density of the elliptical shape of the linear protrusion is 1.5 pieces/cm² to 6000 pieces/cm².

7. The film capacitor according to claim 5, wherein a major axis direction of the elliptical shape of the linear protrusion extends toward the longitudinal direction side of the resin layer.

8. The film capacitor according to claim 1, wherein
the linear protrusion has an average width of 1 µm to 10 µm and an average height of 0.01 µm to 0.2 µm,
the linear protrusion has an elliptical shape, and
a density of the elliptical shape of the linear protrusion is 6000 pieces/cm² or less.

9. The film capacitor according to claim 5, wherein the density of the elliptical shape of the linear protrusion is 1.5 pieces/cm² to 6000 pieces/cm².

10. A film for a film capacitor, the film comprising:
a resin layer having a linear protrusion on a first surface thereof and a linear recess on a second surface thereof opposite the first surface,
wherein a total length of the linear recess per 1 cm² is 3 m or less, and an average depth of the linear recess is 0.01 µm to 1.3 µm.

11. The film for a film capacitor according to claim 10, wherein
the linear recess has an average width of 1 µm to 10 µm and an average depth of 0.01 µm to 1.0 µm,
the linear recess has an elliptical shape, and
a density of the elliptical shape of the linear recess is 6000 pieces/cm² or less.

12. The film for a film capacitor according to claim 11, wherein the density of the elliptical shape of the linear recess is 50 pieces/cm² to 6000 pieces/cm².

13. The film for a film capacitor according to claim 11, wherein a major axis direction of the elliptical shape of the linear recess extends toward a longitudinal direction side of the resin layer.

14. The film for a film capacitor according to claim 11, wherein
the linear protrusion has an average width of 1 µm to 10 µm and an average height of 0.01 µm to 0.2 µm,
the linear protrusion has an elliptical shape, and
a density of the elliptical shape of the linear protrusion is 6000 pieces/cm² or less.

15. The film for a film capacitor according to claim 14, wherein the density of the elliptical shape of the linear protrusion is 1.5 pieces/cm² to 6000 pieces/cm².

16. The film for a film capacitor according to claim 14, wherein a major axis direction of the elliptical shape of the linear protrusion extends toward the longitudinal direction side of the resin layer.

17. The film for a film capacitor according to claim 10, wherein
the linear protrusion has an average width of 1 µm to 10 µm and an average height of 0.01 µm to 0.2 µm,
the linear protrusion has an elliptical shape, and
a density of the elliptical shape of the linear protrusion is 6000 pieces/cm² or less.

18. A method of producing a film for a film capacitor, the method comprising:
applying a resin solution onto a base film so as to form a resin layer,
wherein
the base film has a first linear protrusion on a resin solution coating surface,
a total length of the first linear protrusion per 1 cm² of the base film is 3 m or less,
an average height of the first linear protrusion is 0.01 µm to 1.3 µm,
the resin layer has a second linear protrusion on a first surface thereof and a linear recess on a second surface thereof opposite the first surface, and
a total length of the linear recess per 1 cm² is 3 m or less, and an average depth of the linear recess is 0.01 µm to 1.3 µm.

19. The method of producing a film for a film capacitor according to claim 18, wherein the base film is a polypropylene film.

20. A method of producing a film capacitor, the method comprising:
providing the film obtained by the method according to claim 18; and
forming a metal layer on the first surface of the resin layer.

* * * * *